United States Patent [19]
Hillström et al.

[11] Patent Number: 6,001,220
[45] Date of Patent: Dec. 14, 1999

[54] DEODORISATION PLANT FOR FATTY OILS

[75] Inventors: Anders Hillström, Tullinge; Peter Sjöberg, Solna, both of Sweden

[73] Assignee: Alfa Laval AB, Lund, Sweden

[21] Appl. No.: 09/029,673

[22] PCT Filed: Jul. 1, 1997

[86] PCT No.: PCT/SE97/01186

§ 371 Date: Mar. 3, 1998

§ 102(e) Date: Mar. 3, 1998

[87] PCT Pub. No.: WO98/00484

PCT Pub. Date: Jan. 8, 1998

[30] Foreign Application Priority Data

Jul. 3, 1996 [SE] Sweden ................................. 9602625

[51] Int. Cl.$^6$ ................. B01D 3/10; C11B 3/14
[52] U.S. Cl. ............. 202/153; 159/16.1; 159/DIG. 16; 202/158; 202/205; 261/75; 554/175; 426/488
[58] Field of Search ............... 202/153, 205, 202/158, 236; 203/91–92, 96, 49, DIG. 11, 89; 422/5, 212; 159/13.1, DIG. 16, 16.1, 16.3, 4.04; 261/DIG. 72, DIG. 17, 75; 426/488, 492, 487; 196/114, 127; 99/472–474; 554/175

[56] References Cited

U.S. PATENT DOCUMENTS

| | | | |
|---|---|---|---|
| 3,542,653 | 11/1970 | Lowreys et al. | 203/92 |
| 3,893,893 | 7/1975 | Miserlis et al. | 202/154 |
| 3,933,953 | 1/1976 | Leva | 426/488 |
| 4,297,112 | 10/1981 | Naylor | 96/200 |
| 4,394,221 | 7/1983 | Stage et al. | 203/89 |
| 4,406,743 | 9/1983 | MacQueen et al. | 196/46 |
| 4,971,660 | 11/1990 | Rivers, Jr. | 203/91 |

*Primary Examiner*—Virginia Manoharan
*Attorney, Agent, or Firm*—Fish & Richardson P.C.

[57] ABSTRACT

A deodorisation plant for treatment of fatty oils comprises a vessel (1) connected to a vacuum source. In the vessel there is a distillation column filled with structured packing material through which column the oil which shall be deodorised is brought to flow under influence of gravity and to meet a deodorisation gas in counter-current. In the vessel there is also a number of trays for collection of oil provided with drainage outlets in their lower part. The oil is treated with deodorisation gas in a batchwise way in these trays. The vessel is provided with an inlet (7) for oil and a connection (2) to a vacuum source in its upper part. In its lower part there is an outlet (9) for oil.

6 Claims, 3 Drawing Sheets

# DEODORISATION PLANT FOR FATTY OILS

FIELD OF THE INVENTION

The present invention relates to a deodorisation plant for fatty oils comprising a vessel connected to a vacuum source.

BACKGROUND OF THE INVENTION

When producing consumer products from different vegetable or animal oils deodorisation is a part in the refining process. During the deodorisation the oil is heated to a high temperature 180–275° C. in order to drive off volatile impurities and undesired substances from the oil. These substances have a lower boiling point than the different triglycerides which constitute the fatty oil. The deodorisation is carried through under vacuum conditions, 1–20 mbar absolute pressure, and the removal is facilitated by addition of deodorisation gas to the oil. The gas facilitates the removal of undesired substances.

On the market there are today a large number of different deodorisation plants, both for continuous flow through the plant and with a batchwise treatment of the oil. During continuous deodorisation the oil usually flows over a number of trays or containers which are stacked vertically in a circular shell manner. In the bottom of the trays or containers there are means for addition of gas. Alternatively the gas may be added by using a means with siphon effect. Oil and gas are forced upwards in an ejector tube towards a deflection plate and is finely divided against the same. The oil is added to the vessel in the upper part of the plant and flows from an upper container to the next container. In order to control the flow through the containers these are provided with screening plates, such that the oil flows from an inlet at a certain place in the container to an outlet in another place. The holding time in the vessel is set to a certain value depending on the geometry of the flow channels. The switch-over time between different products is long.

When the deodorisation is carried through in batches all operations (distillation and heat holding for bleaching) usually take place in the same vessel. This method of working makes rapid changes between different oil products possible, but the holding time is long since it depends both on distillation and heat transfer effect.

SUMMARY OF THE INVENTION

The present invention offers a solution of the problem to rapidly change the holding time for different operations in the deodorisation plant but still make it possible to rapidly change between different oil products. A deodorisation plant according to the invention comprises a vessel connected to vacuum in which there is both a distillation column filled with the structured packing material, through which column the oil which shall be deodorised is brought to flow under influence of the gravity and meet deodorisation gas in counter-current, and a number of trays for collection of oil provided with drainage outlets in their lower parts, in which trays the oil is treated in batches with deodorisation gas. The vessel is in its upper part provided with an inlet for oil and a connection to a vacuum source and with an outlet for oil in its lower part.

The column is as mentioned filled with a structured packing material the purpose of which is to create an increased area of contact and an increased time for contact between the oil and the deodorisation gas. Such packing material is available on the market and is used for many different purposes. The time for passing the column is usually 5–15 min. Due to the efficiency of the column the desired deodorisation (removal of volatile impurities) may take place also at lower temperatures, which diminishes the formation of transfatty acids. The working pressure (vacuum) may be kept low, below 5 mbar and if desired also below 1 mbar. The efficient contact in the column also results in a lower demand on the amount of deodorisation gas.

Usually the column is arranged uppermost in the vessel, but if it is desirable one or several trays for a first bachwise treatment may of course be arranged above the column. If the distillation column is arranged at the top of the vessel the oil is suitably added to the same heated to a desired high temperature. The holding time in the vessel may be chosen to 20–75 min.

With advantage the trays are without flow directing insets, but provided with means for supply of deodorisation gas in the vicinity of the bottom of the tray.

A connection for deodorisation gas is arranged in the lower part of the vessel close to the outlet from the vessel.

A deodorisation plant according to the invention is preferably provided with tubes which connect the space above each tray with the space under the column, which makes it possible to achieve a desired vacuum level in the whole vessel.

According to the invention a heat exchanger may with advantage be arranged in the outlet from the vacuum vessel This heat exchanger is divided in sections which are connected to each other by cut-off valves. In each section there are means for supply of deodorisation gas. The sections are preferably arranged at different height making it possible for the oil to flow from section to section by gravity. The treated oil from the vacuum vessel enters the uppermost section. In each section there is also a tube through which oil to be treated in the vessel is directed. This untreated oil is heated by the treated oil which is valuable for energy saving reasons. The deodorisation gas, which is used in the heat exchanger, is led to the space below the column and is used for deodorisation purposes also in the column.

BRIEF DESCRIPTION OF DRAWINGS

The deodorisation plant according to the invention is described further with reference to the attached drawing, FIG. 1 of which shows the plant as such, while FIG. 2 schematically shows how the plant can be used in order to be able to change rapidly between different oil products.

DETAILED DESCRIPTION OF THE PREFERRED EMBODIMENTS

Figure 1:
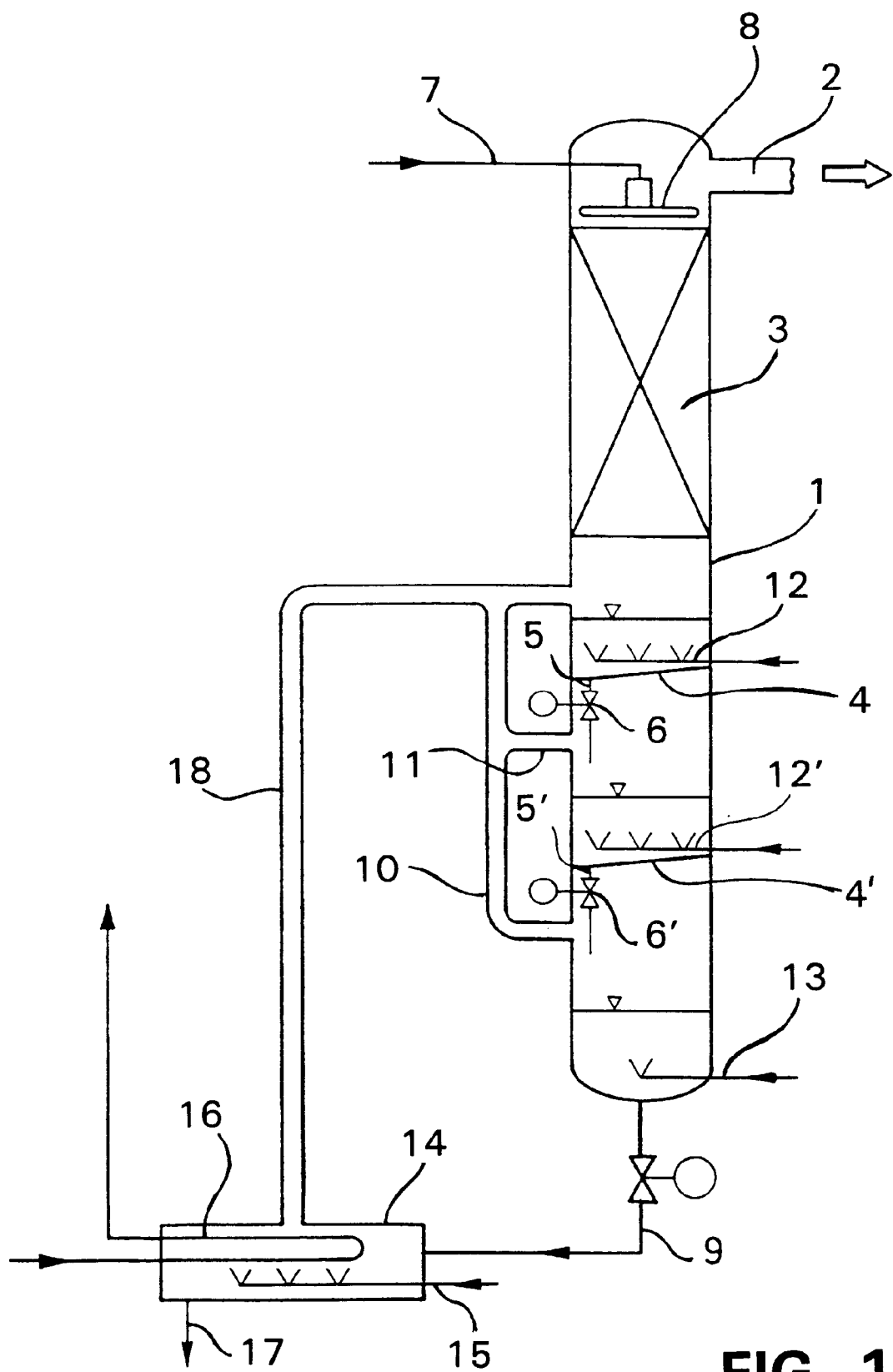

As may be seen in FIG. 1 the deodorisation plant comprises a vessel 1 provided with a connection to a vacuum source. In the upper part of the vessel there is a distillation column 3 consisting of a structured packing material which completely fills the cross-section of the vessel. In the lower part of the vessel there are bottoms 4, 4' which are provided with outlet openings 5,5' in their lower part. Below the outlet there are cut-off valves 6, 6'. These bottoms 4, 4' and the circular walls of the vessel form trays in which the oil is collected. In the upper part of the vessel there is a supply tube 7 for the oil product which is to be treated in the vessel. Over the column there are means 8 to distribute the added oil product over the whole cross-section of the vessel. In the bottom of the vessel there is also a tray formed by the lower part of the vessel with an outlet 9 through which treated product is drawn away. Outside the vacuum vessel there is a tube 10 which connects the space under the lowest bottom 4' with the space under the column 3. Also the space between the bottoms 4 and 4' is connected to the space under the column 3 through the tubes 10 and 11. Just over the bottoms 4, 4' there are inlet tubes 12, 12' for deodorisation gas. An inlet tube 13 for such gas is also arranged in the bottom tray.

A plant of the kind shown now may be used in the following way. The oil which is to be treated in the deodorisation plant is pretreated in a manner known per se by preheating deaeration and heating with a further removal of air to a deodorisation temperature of 250–260° C.

After this heating the oil is directed into the deodorisation plant by way of the pipe 7 and is distributed over the cross-section of the column 3. The oil flows downwards through the column in the form of thin films which continuously are transformed and redivided by the inert packing material. In the column the oil film meets deodorisation gas in counter-current. In the vessel which by way of the connection 2 is connected to a vacuum source there is a pressure of 0.5–20 mbar. The deodorisation gas usually consists of steam but nitrogen gas or carbon dioxid may also be used.

Volatile, undesired products are set free from the oil during influence of the deodorisation gas and vacuum.

When the oil has passed the column it is collected in a first tray surrounded by the walls of the vessel, which is formed over the bottom 4. Close to the bottom 4 there is a means 12 for supply of deodorisation gas. Into this tray the main part of the gas is supplied which gas after having passed the amount of collected oil flows upwards against the lower part of the column. The oil which has flown through the column in a continuous way is collected in the tray which is limited by the bottom 4. In this the oil is kept during a desired time, while it is flown through by deodorisation gas. During this treatment a chemical effect on the oil takes place as a consequence of the high temperature. Due to the fact that gas the whole time flows through the oil undesired, breaking down products are removed.

After the desired holding time the valve 6 is opened and the oil is transferred to the next tray formed by the bottom 4' and the walls of the vessel. Also in this tray deodorisation gas is supplied by way of the means 12'.

When the desired holding time has been obtained the valve 6' is opened and the oil is collected in the bottom of the vessel. After a suitable time it is led away through the outlet 9. Deodorisation gas is added also here by means 13.

From the vessel 1 the treated oil is directed to a heat exchanger 14 where deodorisation gas is added by means 15.

In the heat exchanger there is also an U-tube 16 through which oil, which later is to be treated in the vessel, is forced to flow. The untreated oil is heated by the deodorised oil leaving the vessel 1. The chilled treated oil leaves the heat exchanger through the outlet 17. The gas leaves the heat exchanger through the tube 18 which is connected to tube 10. By such an arrangement the gas, which is used for deodorisation in the heat exchanger, is utilized also in the column 3.

In the shown embodiment the plant comprises one column and two trays for batchwise treatment. Within the limit of the invention it is of course possible to work with further columns and fewer or more trays.

As has been described above the trays for the batchwise treatment are created by the bottoms and the walls of the vessels. There are no flow directing insets in the trays but the oil is only collected until a desired volume has been obtained. The height of the liquid in each tray may be up to 50–60 cm.

Figure 3:
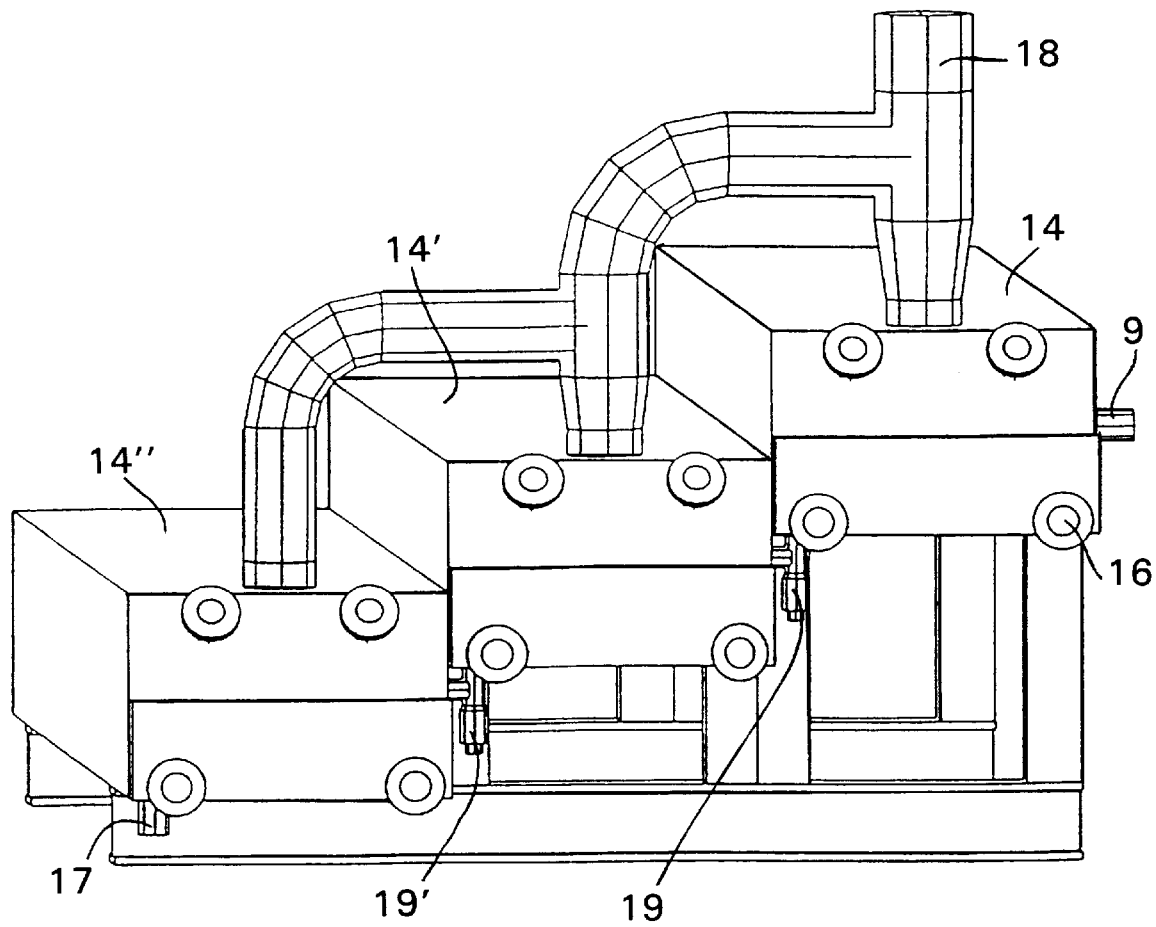
FIG. 3 shows a perspective drawing of the heat exchanger connected to the vacuum vessel.

FIG. 3 shows the heat exchanger (economiser) 14 in detail. As may be seen in the drawing the heat exchanger is divided into three sections 14, 14' 14" which are connected. The oil enters the uppermost section 14 through a pipe connected to outlet 9. Deodorisation gas is added to each section by means (not shown in the drawing). The gas leaves the sections through tubes connected to tube 18. The oil to be heated is directed to an U-tube 16 the in- and outlets of which are shown close to the bottom of each section. At the top of the section there are sight glasses.

As mentioned the treated oil enters the uppermost section and leaves the same after a desired holding time. Between the sections there are cut-off valves 19, 19' which make it possible to use all sections in the heat exchanger in succession or to leave one section empty if one desires to change between oils of different kinds. The oil flows from section to section due to gravity and leaves the heat exchanger through the outlet 17.

Figure 2:
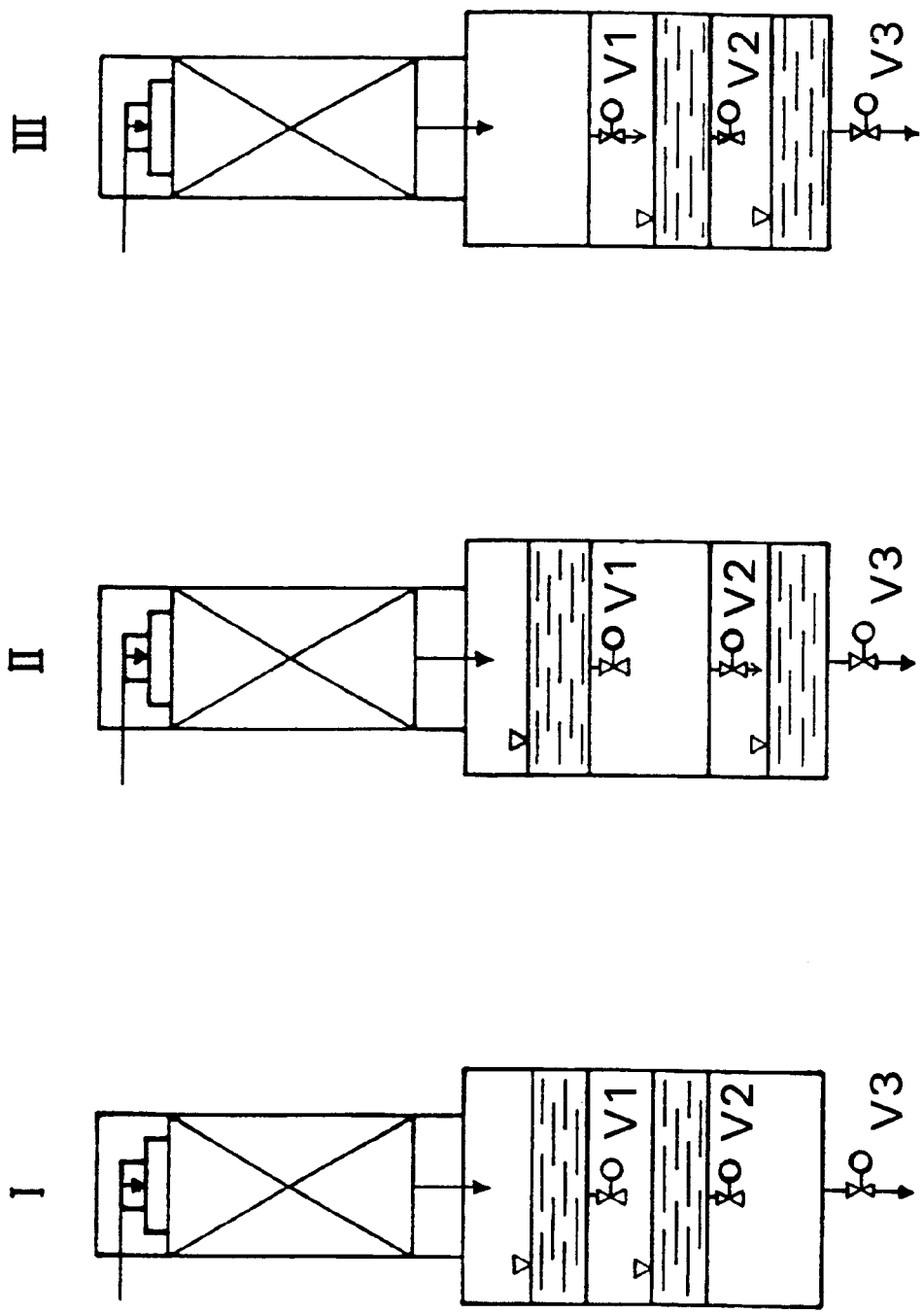

The deodorisation plant according to the invention presents great advantages when one wants to change from one oil product to another. In FIG. 2 it is described schematically how such a change may take place. The valves V1 and V2 close the outlets from the trays, while the valve V3 closes the outlet from the vessel 1.

When the most of the oil in the bottom of the vessel has been emptied the oil change is initiated. The supply of oil to the column is stopped and the oil which is in the column is drained to the upper tray. The oil which has been heat treated in the lower tray is transferred to the lower part of the vessel by opening the valve V2. The oil in the upper tray is thereafter directed to the lower tray by opening the valve V1. When the upper tray is emptied and the content in the lower tray has been transferred to the bottom of the vessel 1, oil change may take place and new oil is added to the column. The new oil is then collected in the upper tray while the lower tray is empty.

What is claimed is:

1. A deodorization plant for treatment of fatty oils comprising a vessel connected to a vacuum source, said vessel (1) further comprising a distillation column (3), means for flowing oil to be treated under the influence of gravity through said column, and means for flowing a deodorization gas in a countercurrent direction from said oil in said column, said distillation column (3) being filled with structured packing material, a plurality of trays for the collection and treatment of said oil, each provided with at least one drainage outlet in its lower part, said plurality of trays providing locations for batchwise treatment of said oil with said deodorization gas, an inlet (7) for said oil, a connection (2) to a vacuum source in an upper part of said vessel (1), and an outlet (9) for said oil in a lower part of said vessel (1).

2. The deodorization plant according to claim 1, wherein the column (3) is arranged above the trays in the vessel.

3. The deodorization plant according to claim 1, wherein the trays are provided with means (12, 12') for addition of said deodorization gas to the oil near to the respective bottoms of the trays.

4. The deodorization plant according to claim 1, further comprising means (13) for supplying deodorization gas in the tray in the lower part of the vessel nearest to the outlet from the same.

5. The deodorization plant according to claim 1, wherein the vessel is provided with tubes (10, 11) which connect spaces above each tray with a space provided under the column.

6. The deodorization plant according to claim 1, further comprising a heat exchanger (14) which is divided into a plurality of sections and is connected to the outlet (9) from the vessel, said sections being connected to each other by cut-off valves (19, 19') and provided with means for supplying deodorization gas.

* * * * *